United States Patent [19]

Berti

[11] 4,300,493
[45] Nov. 17, 1981

[54] ENGINE BALANCER FOR A FOUR CYLINDER IN-LINE INTERNAL COMBUSTION ENGINE

[75] Inventor: Jerome L. Berti, Chicago Heights, Ill.

[73] Assignee: Allis-Chalmers Corporation, Milwaukee, Wis.

[21] Appl. No.: 925,755

[22] Filed: Jul. 18, 1978

[51] Int. Cl.³ .......................................... F02B 75/06
[52] U.S. Cl. .................. 123/192 B; 74/604
[58] Field of Search ........... 123/192 B; 74/604; 64/1

[56] References Cited

U.S. PATENT DOCUMENTS

| | | | |
|---|---|---|---|
| 2,284,515 | 5/1942 | Criswell | 123/192 B |
| 2,914,137 | 11/1959 | Sykes, Jr. | 123/192 B |
| 2,914,963 | 12/1959 | Scherenberg | 74/604 |
| 2,914,964 | 12/1959 | Bensinger et al. | 74/604 |
| 3,402,707 | 9/1968 | Heron | 123/192 B |
| 3,667,317 | 6/1972 | Hillingrathner | 123/192 B |
| 3,710,774 | 1/1973 | Weseloh et al. | 123/192 B |

FOREIGN PATENT DOCUMENTS

| | | | |
|---|---|---|---|
| 636201 | 10/1936 | Fed. Rep. of Germany | 74/604 |
| 1177408 | 4/1963 | Fed. Rep. of Germany | 123/192 B |
| 2224002 | 12/1973 | Fed. Rep. of Germany | 123/192 B |
| 219326 | 9/1968 | U.S.S.R. | 123/192 B |
| 244802 | 1/1971 | U.S.S.R. | 123/192 B |

Primary Examiner—Charles J. Myhre
Assistant Examiner—W. Wolfe
Attorney, Agent, or Firm—Arthur L. Nelson

[57] ABSTRACT

An engine balancer for a four cylinder in-line internal combustion engine. The balancer is mounted centrally under the crankshaft and driven by a drive gear adjacent the nodal point of torsional vibrations on the crankshaft. The balancer is for secondary forces on the engine and the drive reduces feed of torsional vibrations to the engine balancer from the crankshaft.

10 Claims, 7 Drawing Figures

ENGINE BALANCER FOR A FOUR CYLINDER IN-LINE INTERNAL COMBUSTION ENGINE

This invention relates to an engine balancer and more particularly to an engine balancer for a four cylinder in-line internal combustion engine having the balancer drive at the nodal point on the crankshaft reducing torsional vibration input feed from the crankshaft to the engine balancer.

The conventional four cyinder internal combustion engine has a crank arrangement in which the crank arms on each of the ends of the crankshaft are 180 degrees out of phase with the two center crank arms. Assuming that the main concern in balancing is in overcoming the primary and secondary forces caused by an unbalance of the crank arms and the crank pins relative to the center of rotation of the crankshaft on its main bearings. The crank arms are integral with the crank pins which rotatably support the large ends of the connecting rods which further increase the mass which rotates eccentrically about the axis of rotation of the main bearings. The portion of each of the crank arms and the mass of the large bearing of the connecting rod is usually counterbalanced by a counterweight on the crankshaft. The frequency of these forces is the frequency of the engine speed. Since the four cylinder engine end crank arms are 180 degrees out of phase with the two center crank arms the primary forces essentially counterbalance each other.

Accordingly, balancing the secondary forces are of the main concern in an engine of this type. The secondary forces are produced by the piston and the connecting rod connected to each crank arm. These forces are basically reciprocating forces and are essentially directed in a vertical plane. They are brought into existence by the angularity of the connecting rod and the varying ratio of the rod to the crank arm length and these forces are produced at a rate of twice the frequency of the primary forces or twice the frequency of the engine speed. Accordingly, these forces are considered forces of the second order since their frequency is twice that of engine speed with the secondary forces being twice the frequency of the primary forces. The secondary forces operate in the same direction and each crank arm and connecting rod produce forces of the same magnitude and in the same direction. The result of the secondary forces in a four cylinder engine of this design is four times the force of any one cylinder in the engine. Accordingly, the unbalanced secondary forces can develop a considerable resultant force and an engine balancer must be incorporated in the engine.

An internal combustion produces torque for delivering power from the engine. Normally a flywheel is mounted on the end of the crankshaft which delivers the torgue to the driveshaft. The torque is generated by a series of violent explosions in the combustion chambers which operate against the pistons which drive the connecting rods and crank arms rotating the crankshaft. The torque producing means is not without torsional stress and torsional vibrations in the crankshaft. The flywheel is designed to reduce the effect of impulses supplied to the crankshaft and to deliver a relatively smooth torque from the engine. Each crankshaft has a natural frequency of vibration which may vary with each crankshaft. The natural frequency of vibration of the crankshaft increases with diameter of the shaft and decreases with the length.

It is fundamental that the engine should not operate with the impulses due to firing at the natural frequency or any harmonic of the natural frequency of the crankshaft. The torsional vibrations of the crankshaft are due to the elasticity of the crankshaft which oscillates relative to the flywheel which has weight, and therefore its inertia or resistance to change in speed is so great that it may be regarded as holding the shaft fixed at a relatively constant speed while the free end of the crankshaft torisonally flexes. The flywheel is considered the nodal point which is relatively free of the torsional vibrations in the crankshaft. The torsional vibrations of the crankshaft are essentially eliminated in the drive from the crankshaft at the nodal point of torsional vibrations. Accordingly, this invention provides the drive for a secondary force engine balancer for a 4 cylinder in-line internal combustion engine at the main bearing adjacent the flywheel of the engine.

Accordingly, it is an object of this invention to provide a secondary force balancer driving from a gear mounted on the crankshaft adjacent the flywheel of the engine.

It is another object of this invention to provide an engine balancer driven from a gear on the crankshaft at the nodal point for torsional vibrations to reduce torsional vibration input to the engine balancer.

It is a further object of this invention to provide a secondary force engine balancer for a four cylinder internal combustion engine mounted under the crankshaft and driven from a point adjacent the nodal point for torsional vibration of the crankshaft.

It is a further object of this invention to provide a secondary force engine balancer for a four cylinder in-line internal combustion engine with a drive from the crankshaft adjacent the flywheel on the engine. The balancer is mounted with eccentric weights rotating about axes parallel with the crankshaft axis having adjustable means for adjustably timing the angular position of the weights relative to the angularity of the crankshaft.

The objects of this invention are accomplished by providing a secondary force engine balancer on a four cylinder internal combustion engine mounted for driving the eccentric weights on axes parallel with the crankshaft axis. The drive for the balancer is from a drive gear on the crankshaft mounted adjacent the flywheel of the engine and at the nodal point of torsional vibrations from the engine to reduce torsional vibration input to the engine balancer. The drive for the engine balancer essentially eliminates torsional vibrations to the engine balancer.

Referring to the drawings.

Figure 1:
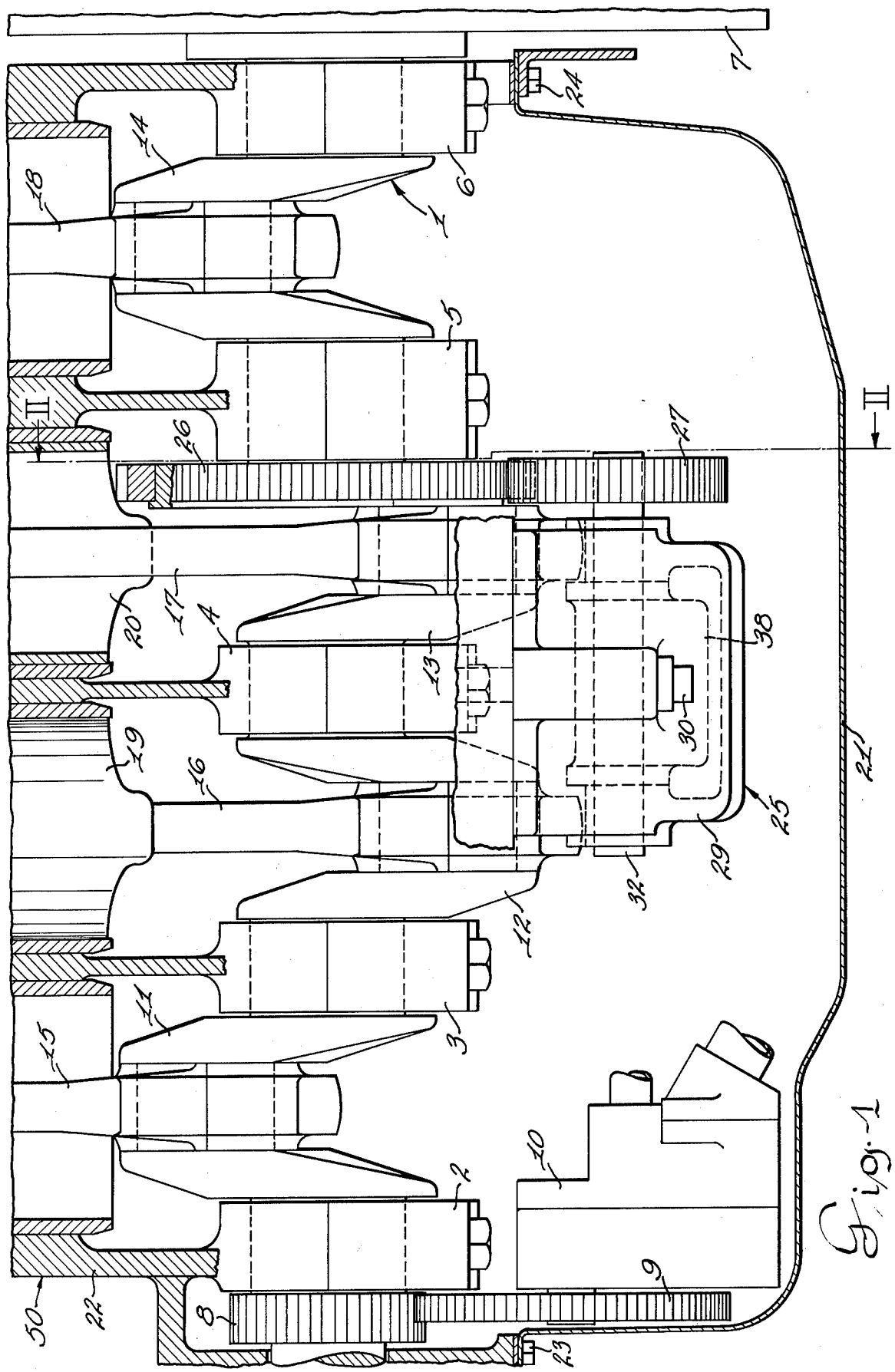
FIG. 1 illustrates a section view of the engine showing the crankshaft and balancer and the drive for the balancer near the flywheel end of the crankshaft.
Figure 2:
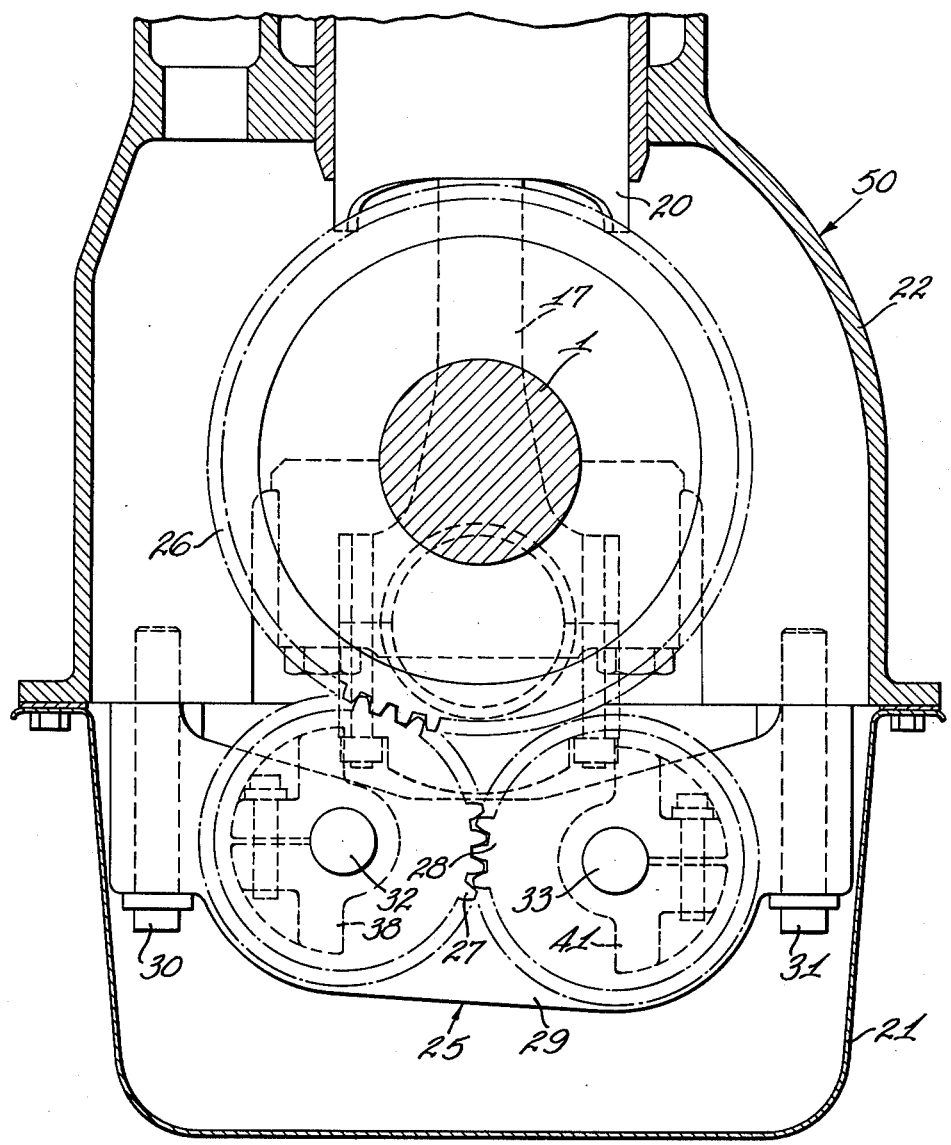
FIG. 2 is a cross-section view taken on line II—II, FIG. 1.
Figure 3:
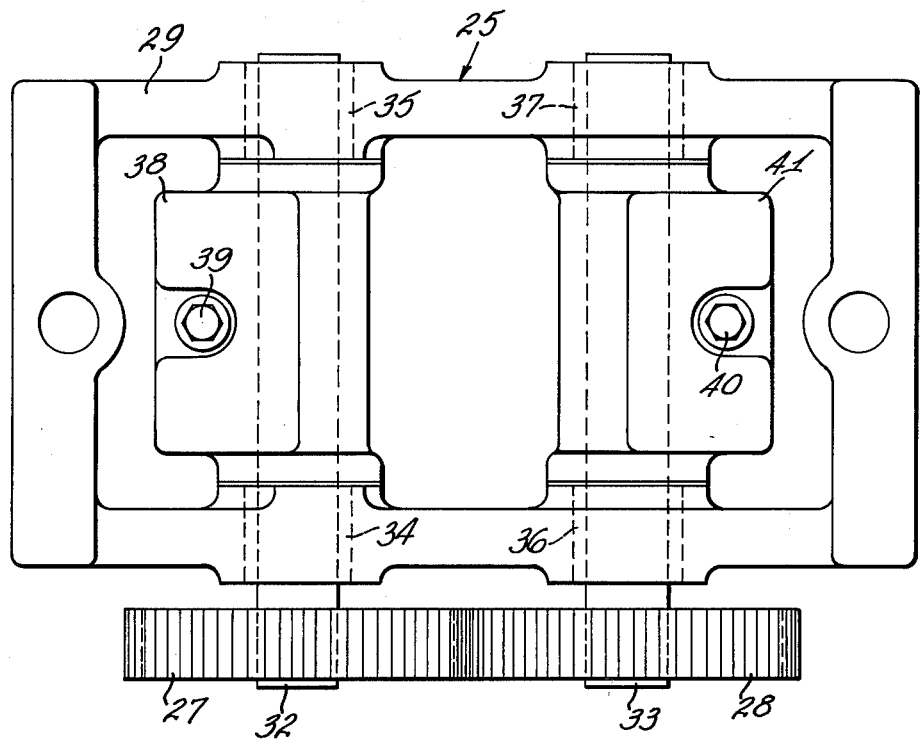
FIG. 3 is a plan view of the engine balancer and the gears for driving the balancer.
Figure 4:
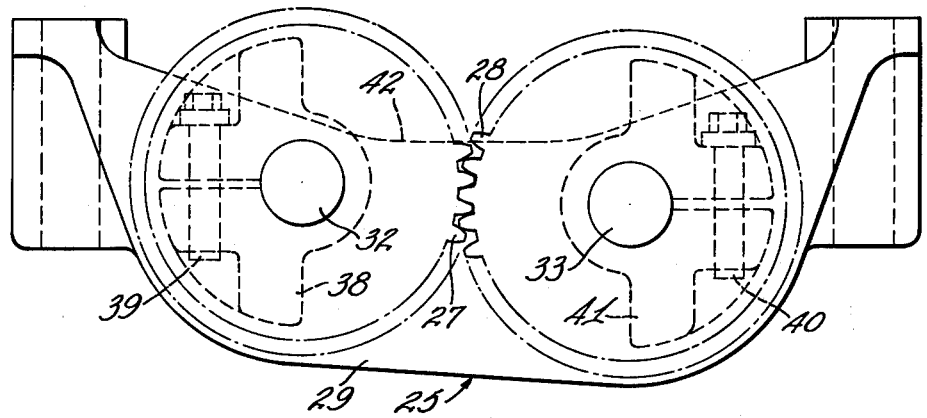
FIG. 4 is a cross-section view showing the end view of the balancer.
Figure 5:
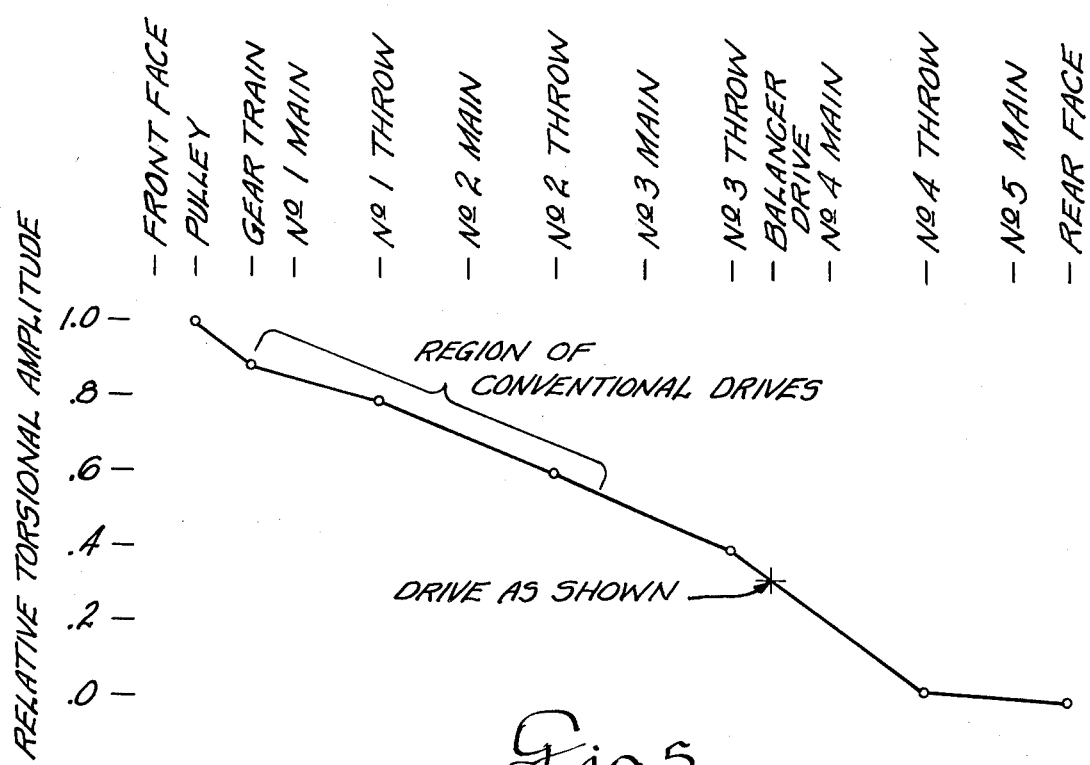
FIG. 5 is a graph illustrating relative torsional vibration amplitude at various points along the length of the crankshaft.
Figure 6:
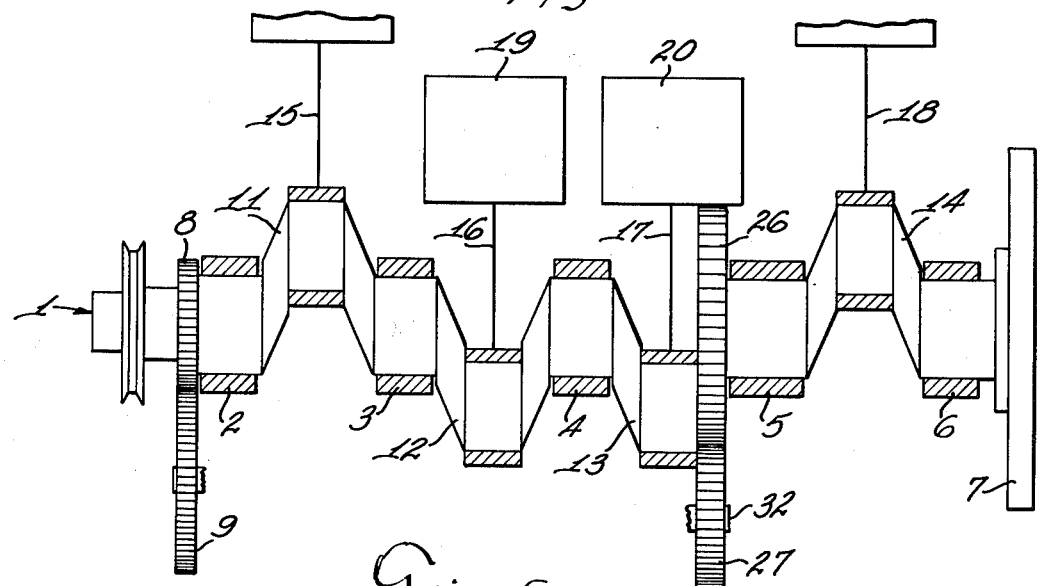
Figure 7:
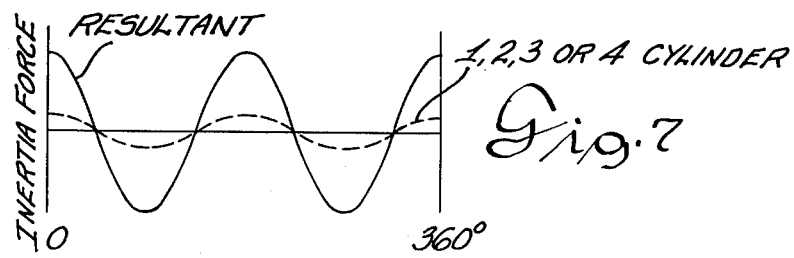

FIG. 6 schematically illustrates the various points along the crankshaft from the front face to the rear face for the graph shown in FIG. 5; and FIG. 7 illustrates the secondary inertia forces of a four-cylinder in-line engine as shown in FIG. 1.

Referring to the drawings, the preferred embodiment of this invention is illustrated. A crankshaft 1 is rotatably supported in the main bearings 2, 3, 4, 5 and 6. A flywheel 7 is fixed to the end of the crankshaft 1 and the flywheel end of the crankshaft 1 drives the output shaft. The opposite end of the crankshaft 1 is connected to the gear 8 which drives the oil pump 10 through gear 9. The crankshaft 1 has four crank arms 11, 12, 13 and 14, each connected to a connecting rod 15, 16, 17 and 18, respectively. Crank arms 11 and 14 are 180 degrees out of phase with crank arms 12 and 13. Connecting rods 16 and 17 are connected to pistons 19 and 20, respectively. The pistons form combustion chambers with the cylinder sleeves and engine head to provide the driving power to produce the driving torque of the engine.

The oil pan 21 is fastened to the engine block 22 by means of which bolts 23 and 24 are shown. The oil pan forms an oil reservoir for the engine and encloses the balancer 25. The ring gear 26 is mounted on the crankshaft adjacent the main bearing 5 and drives the driven gear 27. The driven gear 28 is in constant mesh with the driven gear 27 and both gears 27 and 28 rotate at the same speed. A casing 29 encases the balancer and the casing is fastened by means of bolts 30 and 31. The gear 27 is mounted on the shaft 32 while gear 28 is mounted on the shaft 33. The shaft 32 is rotatably mounted in the needle bearings 34 and 35 while the shaft 33 is mounted in the needle bearings 36 and 37. The eccentric weight 38 is adjustably fastened to the shaft by means of the screw 39. The screw 40 tightens the eccentric weight 41. Each of the screws 39 and 40 provides a means of angularly positioning the respective eccentric weight on the mating shaft to align the weight angularly on the shaft and angularly relative to the crankshaft.

The casing 29 is formed with recesses 42 to provide crankshaft clearance on each side. Oil retained within the casing is thrown out by weights 38 and 41 during engine operation.

FIGS. 5 and 6 show the relative amplitude of torsional vibration of various points of the crankshaft. The tests for recording the amplitude of torsional vibration are shown from the front face to the rear face of the crankshaft and various points along the main bearings and the 1, 2, 3 and 4 throws of the crankshaft. The graph shows that the torsional vibration progressively decreases from the front face to the rear face of the crankshaft. Accordingly, the drive gear 26 on the crankshaft is positioned rearwardly as far as is feasible for driving of the engine balancer. FIG. 6 shows the drive gear by the fourth main bearing and positioning at the fifth main bearing would indicate even less vibration input. Accordingly, the torsional vibration input to the balancer is essentially eliminated by operating the balance in a manner as shown in this graph. The relative components as taken from the crankshaft are shown in FIG. 6.

The operation of the balancer for a four cylinder in-line engine as above described operates in the following manner. The engine 50 is a four cylinder in-line engine in which the crank arms 11 and 14 are angularly spaced 180 degrees out of phase with the crank arms 12 and 13. With this arrangement, the primary forces are balanced since the crank arms 11 and 14 are compensating for the unbalance of the crank arms 12 and 13. The secondary forces are balanced by the balancer 25 mounted on the underside of the crankshaft 1. The balancer 25 is driven by the ring gear 26 mounted at the fourth main bearing. A modification of the drive is shown where the ring gear is positioned at the fifth main bearing which is essentially the nodal point of the crankshaft 1. By driving the balancer 25 at the fifth main bearing, torsional vibrations are essentially nil. Accordingly, there is no input feed of torsional vibration to the balancer 25. This will keep the rotation of the counterweights of the balancer in phase with each other and 180 degrees out of phase with the forces of the secondary unbalance of the engine shown in FIG. 7.

Accordingly, this will provide a smoother running engine with greater reliability since the torsional vibrations are not fed into the balancer to produce any roughness caused by phase shift of the balancer relative to the crankshaft. Placing the balancer in the center of the engine produces a resultant counterforce to offset the resultant forces of the secondary forces shown in FIG. 7 for the four cylinder in-line internal combustion engine.

The embodiments of the invention in which an exclusive property or privilege is claimed are defined as follows:

1. An engine balancer on a four cylinder in-line engine comprising, a crankshaft rotatably mounted on an axis of rotation, a plurality of main bearings rotatably supporting said crankshaft, a drive end of said crankshaft for the output drive of said crankshaft, a flywheel firmly fixed to said drive end of said crankshaft defining a nodal point of crankshaft torsional vibrations, a plurality of pistons connected through connecting rods driving said crankshaft, and engine balancer centrally mounted relative to said crankshaft including a pair of counterweights eccentrically mounted on axes of rotation parallel to said crankshaft axis, a balancer drive gear directly connected to said crankshaft adjacent one of the main bearings in the low torsional vibration amplitude area on the flywheel side of said balancer near the flywheel and said nodal point of torsional vibrations, driven gear means on the flywheel side of said balancer driven by said drive gear to thereby essentially eliminate transmission of torsional vibration from said crankshaft to said balancer.

2. An engine balancer on a four cylinder in-line engine as set forth in claim 1 wherein said balancer includes a casing mounting said balancer under said crankshaft.

3. An engine balancer on a four cylinder in-line engine as set forth in claim 1 wherein, said counterweights of said balancer include a clamping structure and screw fastening means for selectively angularly adjusting said counterweights on their respective shafts to adjust the angular position of said counterweights relative to the rotation of said crankshaft.

4. An engine balancer on a four cylinder in-line engine as set forth in claim 1 including five main bearings axially spaced between crank arms on said crankshaft with the fifth main bearing adjacent said flywheel, means fastening said drive gear adjacent said fourth main bearing.

5. An engine balancer on a four cylinder in-line engine as set forth in claim 1 including, five main bearings rotatably supporting said crankshaft with the main bearings positioned intermediate each of four crank arms of said crankshaft and at each end of said crankshaft, means connecting said drive gear adjacent said fifth main bearing.

6. An engine balancer on a four cylinder in-line engine as set forth in claim 1 including means defining a nodal point adjacent said flywheel, means connecting said drive gear on said crankshaft for driving said balancer at the nodule point adjacent said flywheel.

7. An engine balancer on a four cylinder in-line engine as set forth in claim 1 wherein, said crank arms of said crankshaft lie in a common plane.

8. An engine balancer on a four cylinder in-line engine as set forth in claim 1 including, means mounting said balancer on the underside of said crankshaft.

9. An engine balancer on a four cylinder in-line engine as set forth in claim 1 including, five main bearings for rotatably supporting said crankshaft.

10. An engine balancer on a four cylinder in-line engine as set forth in claim 1 including, a driven gear mounted on each shaft fixed to each of said counterweights, needle bearings rotatably supporting each of said shafts for rotation about said axes parallel with said crankshaft axis.

* * * * *